Patented Feb. 24, 1942

2,273,864

UNITED STATES PATENT OFFICE 2,273,864

REACTIVATION OF HYDROGENATING CATALYSTS

Eugene J. Houdry, Ardmore, Pa., assignor to Houdry Process Corporation, Wilmington, Del., a corporation of Delaware No Drawing. Application February 24, 1939, Serial No. 258,174

12 Claims. (Cl. 252—243)

This invention involves a method of restoring catalysts to active condition and has special application to catalysts for promoting hydrogenating operations and capable of effecting syntheses which may or may not involve the addition of hydrogen. Hydrogenating catalysts, such as nickel, cobalt, iron, copper, etc., or mixtures or alloys of the same, alone or supported on carriers, are widely used in the hydrogenation of organic substances such as unsaturated and aromatic hydrocarbons, ethers, alcohols, aldehydes, ketones, glycerides, fatty acids, oils, and for the hardening of fats.

It is a requisite of low pressure hydrogenating operations that a very active hydrogenating catalyst be used. Acceptable yields are obtainable in some cases with less active catalysts, or with partly poisoned catalysts, when high pressures are used, especially when operating temperatures can also be increased. It is well known that sulphur and sulphur compounds are extremely deleterious to the ability of a catalyst to promote hydrogenating reactions and it has heretofore been believed that impairment of activity by sulphur poisoning was permanent. Hence it has been the practice to replace the catalyst at frequent intervals when the operation necessitates a high degree of hydrogenating activity, or to run for more extended periods with progressively lower yields when the decreasing activity of the catalyst can be compensated at least in part by changes in the operating conditions of rate, temperature and pressure. In many reactions, even very small amounts of sulphur in the feed have necessitated frequent changes of catalyst. Since spent hydrogenating catalysts can still remove sulphur compounds, they are often used to pretreat the charge so as to reduce the sulphur content of the charge and thereby prolong the life of the actual hydrogenating catalyst.

Many attempts have been made to regenerate hydrogenating catalysts, as by reduction with or without oxidation, but all such attempts have failed or at best have been only partly successful, i. e. some restoration of activity has resulted but of diminished extent with each regeneration. Hence it usually has not been considered economical to attempt such regenerations of hydrogenating catalysts, and when attempted, for not more than a few times, as 2 to 4 times, before replacement. To avoid further losses, the discarded catalyst is usually entirely remade or reprocessed so as to be subsequently available as a completely new catalyst.

One object of the invention is to avoid the necessity of replacing a used hydrogenating catalyst by a new hydrogenating catalyst. Another object is to devise a process for restoring a used or poisoned catalyst to a high degree of activity, as substantially equivalent to its original activity when new, and to repeat such restoration indefinitely without substantial diminution of degree of activity after each regeneration. Still another object is to effect the restoration or regeneration with such rapidity as to give it real commercial value and importance.

The present invention rests upon the discovery of how to manipulate and to control known steps of regeneration in such manner that a used catalyst recovers its original ability to promote hydrogenating reactions, especially those effected at relatively low temperatures and pressures where a high degree of hydrogenating activity is essential. The new process involves one or more sequences of oxidizing and reducing steps at a comparatively high temperature or temperatures followed by an oxidation and then by a reduction at as low a temperature as possible or feasible from a practical and commercial standpoint to give the desired results. The lower temperature oxidizing and reducing steps may comprise one or more sequences of such steps.

The first regenerating sequence of oxidizing and reducing steps is effected at 850° F. or above, as up to 1100° F. but preferentially in the range of about 850° to about 1000° F. If the poisoning of the catalyst is slight or of a readily removable character, only one sequence of oxidizing and reducing steps at this temperature level is required before proceeding to the lower level for final treatment. If the poisoning is heavy or in a form highly resistant to removal, two or more sequences of oxidizing and reducing steps in the above temperature range are effected. The oxidizing steps apparently consume a part of the sulphur deposit, convert some of the sulphides to sulphates, and convert some or all of the catalytic metal or metals to oxide form. The reducing step which follows each oxidizing step apparently converts the sulphur in the sulphates and basic sulphates to such gaseous compounds as $H_2S$ and $SO_2$, which are carried away by the gas stream. By employing two or more of such sequences, poisonous deposits which cannot be dislodged in a preceding sequence are removed in a subsequent sequence and the purifying operation is thus carried to the required or desired degree of completion.

The purified catalyst must then be activated and this is effected in the second stage of the regeneration by one or more sequences of oxidizing and reducing steps, at least the final reducing step being conducted at as low a temperature as possible to produce the desired effect in a reasonably short time so that the operation may be commercially economical. This temperature will vary with the composition or metal content of the catalyst, but will be at least as low as 700° F. For nickel, it will be around 600° F., as in the preferential range of 550° to 650° F.; for cobalt and iron, somewhat higher, as around 650° F., or between 600° and 700° F.; for copper, considerably lower, as around 450° to 500° F., or from 350° to 550° F.; etc. Hence the activating stage of the regeneration of hydrogenating catalyst is effected in the broad range of 350° to 700° F., and for the different metals will conform in general to about the temperature of the final reducing step in the making of a new catalyst.

The oxidizing steps are effected with the aid of an oxygen containing medium, such as air, or any other mixture of gases, such as oxygen diluted with inert gas, having the desired or required content of oxygen. Hydrogen, or a hydrogen carrier such as light ends from the lean gas of a refinery if sufficiently purified, is used for the reducing steps.

The oxidizing steps are usually of rather short duration, as not over half an hour and often less, as from 5 to 15 minutes, and each should be followed immediately by its reducing step. The reducing steps at the high temperature stage of the regeneration will be conducted until the evolution of sulphurous gases from the catalyst drops sharply and becomes merely a trace, the periods being equivalent, in most instances, to those of the preceding oxidizing steps.

The reductions effected in the low temperature stage of the regeneration are relatively lengthy, since the activation of the hydrogenating catalyst is a relatively slow process. Here the temperature at which the activation is effected is an important factor, since activation of some metals having hydrogenating power, such as copper, can take place by reduction at as low as 250° F.; but the reactivation would be so slow that days would be necessary to accomplish the same degree of restoration of activity which can be effected in a few hours at higher temperatures. Hence it is important to establish, for the low temperature stage of the regeneration, a temperature or temperature range at or in which reactivation will take place to the desired extent with suitable rapidity. For practical purposes it should not be much if any below the temperature of the reaction for which the catalyst is being prepared. Such activating reductions at the preferential temperatures for the various metals indicated above will usually run from one to five or six hours, so that the total time for the entire cycle of regeneration, including the high temperature and low temperature stages, will not exceed 10 to 12 hours for heavily poisoned catalysts, and, for catalysts which are moderately or only slightly poisoned, complete restoration can be effected in from three to seven hours. The oxidizing medium may be passed through the catalytic mass during the heating up of the mass to the high temperature level and also during the cooling down of the mass from the high temperature level to the low temperature level, thus expediting the regeneration. If this is done, the temperature of the oxidizing medium may be adjusted so as to assist in adding heat to the mass during the heating up period and in extracting heat from the mass during the cooling down period. However, in some instances it is preferable to make the last oxidation before the final reduction step at as low a temperature as possible, as, for example, at the temperature level of such final reduction step.

In commercial operations, it is the intention to arrange apparatus for continuous use by providing two or more converters so that one or more of them can be used for the hydrogenating process while the others are undergoing regeneration or reactivation of the catalyst, each converter alternating in function in known manner. It is preferable, of course, to regenerate the catalyst in place, but, regardless of where the regeneration is effected, provision should be made for uniformity of operating conditions throughout the catalytic mass. In other words, the poisonous deposits should be uniformly distributed as well as uniformly removed from the catalyst, and all parts of the catalytic mass should keep in step during temperature changes, for otherwise maximum yields of desired products cannot be obtained during the on-stream periods, nor can all parts of the catalyst be restored to the same degree of activity during the intervening periods of regeneration. Hence, to attain the benefits of the present invention to best advantage in a practical commercial operation, it is desirable to provide for (1) uniform distribution of reactants throughout the catalytic mass; (2) uniform removal of reaction products from the mass, and (3) uniform addition of heat to and removal of heat from the catalytic mass. A number of types and forms of catalytic converters are known, which will meet these requirements to a greater or less degree. For example, ways of distributing reactants and removing reaction products are illustrated in U. S. Patent No. 2,042,469, issued June 2, 1936, to Alfred Joseph, and in my U. S. Patent No. 2,042,468, issued on the same date. Temperature control of a catalytic zone by an extraneous heat exchange medium such as water, mercury, diphenyl, fused salts, low melting metals like lead and some of its alloys, and the like, is illustrated, for example, in Fig. 8 of the aforesaid Joseph Patent No. 2,042,469; in the U. S. patent of myself and Raymond C. Lassiat, No. 2,078,947, issued May 4, 1937; and in my U. S. Patents Nos. 2,078,948 and 2,078,949, issued on May 4, 1937. Temperature control by both entering reactants and an extraneous heat exchange medium, along with uniform distribution of reactants and removal of products, is also shown in U. S. Patent No. 2,078,950, issued May 4, 1937, to myself and Thomas B. Prickett.

*Example 1*

A nickel catalyst (6.5% by weight of nickel), formed by impregnating an inert porous carrier (of the type disclosed in U. S. Patent No. 1,818,403, issued on August 11, 1931, to Alfred Joseph) with a corresponding amount of hydrated nickel nitrate, had been used for some time in the promotion of various reactions. It was selected to produce octanes from an isooctene ($C_8$) cut of polymer gasoline derived from unsaturates in refinery gases from cracking operations on Coastal and East Texas crudes. The catalyst was prepared for this hydrogenating reaction by alternately oxidizing and reducing with hydrogen at a temperature somewhat above 900° F. followed by another oxidation and a final reduction with hydrogen at about 600° F. The final reduction period lasted three hours, the previous oxidizing and reducing periods being much shorter, as not over one-half an hour each, the entire operation being effected in about 4½ hours.

The hydrogenating reaction was conducted in the temperature range of 375° to 575° F. under 60 lbs. per sq. in. gauge pressure for five hours at a charging rate of 3:5 (three volumes of liquid charge per hour to five volumes of catalyst), hydrogen being added to the charge to the extent of 200% of the amount theoretically required. At the end of the five hour on-stream period, the charge was switched to another converter for a similar period, during which the catalyst in the first converter was regenerated in a manner conforming to the preparatory treatment described above, so that continuous operation was effected by using two converters alternating in function and by conducting the regeneration or reactivation of the catalyst so as to complete it in 4½ hours. Better than 97% hydrogenation was effected over an extended period of use, without any apparent loss of activity on the part of the catalyst, so that changing or reworking of the catalyst was entirely avoided. In the regenerating operation, pressure was not needed, but when moderate pressures up to 300 lbs. per square inch were used in the final low temperature reducing step, there appeared to be a very slight improvement in the activity of the catalyst.

*Example 2*

A nickel catalyst similar to that employed in Example 1, except that it contained 8.1% nickel, was used under substantially the same operating conditions to produce octanes from an iso-octene ($C_8$) cut (200–270° F.) of polymer gasoline made from refinery gases from processing Mid-Continent crudes. This charge produced faster poisoning of the catalyst than the charge in Example 1, and a desulphurizing case using spent nickel catalyst in conventional manner was placed ahead of the hydrogenating zone. It was then found to be possible to secure better than 95% hydrogenation for periods of 2½ hours per converter, requiring three converters for continuous operation instead of two, as in Example 1. Regenerations were still effected in 4½ hours by oxidation and reduction between 900° and 1000° F., followed by an oxidation and final reduction with hydrogen for a period of three hours at about 600° F. Verification that the revivification of the catalyst was complete was made after an extended period of use by switching to the type of charge used for Example 1 for a full five hour on-stream operation with 97% hydrogenation.

*Example 3*

A copper catalyst was prepared by coprecipitation of copper and magnesium nitrate by a solution of sodium hydroxide, the resulting mixture being subsequently washed free of sodium salts, dried, pelleted and reduced in hydrogen, to give a molar ratio of magnesia to copper oxide of about 4:1. In producing octanes under substantially the same operating conditions and with the same charge as in Example 1, it was possible to run for 7½ hours with better than 95% hydrogenation. Reactivation was effected by oxidizing and reducing steps in the temperature range of 900° to 1000° F., followed by oxidizing while cooling the catalyst to about 350° F., final reduction being effected with slowly rising temperature in the range of 350° to 550° F., the total reactivation being accomplished in about 7 hours. Continuous operation was accordingly effected with two converters.

*Example 4*

The same copper catalyst used in Example 3 was utilized to hydrogenate the charge specified in Example 2 under similar operating conditions both with and without preliminary purification of the charge. In both instances better than 95% hydrogenation was effected for 8½ hours, giving continuous operation with two converters.

A typical reactivation at the end of a run consisted in flushing the catalyst with hydrogen in one direction, then with an inert gas, such as nitrogen, in the other, heating up the catalyst to 750° F. or above, blowing with air to effect complete oxidation while the catalyst temperature rose to about 1015° F., reducing the catalyst with a slow flow of hydrogen while the catalyst remained above 900° F., repeating the oxidizing and reducing steps, then oxidizing while cooling the catalyst down to about 350° F., flushing with nitrogen or other inert gas, and then reducing with hydrogen while permitting the temperature of the catalyst to increase at a rate of not more than 50° F. per hour until a maximum of about 550° F. was reached, at which point reduction was continued for one hour, the total period of reactivation being 8 hours or less, as desired.

*Example 5*

The nickel catalyst of Example 2 was utilized for the hydrogenation of the aviation cut of gasoline produced by catalytically cracking heavy bottoms from a blend of Coastal and East Texas crudes, the purpose being to reduce the acid heat of the charge. The reaction was effected in the temperature range of 400° to 500° F. under a pressure of 60 lbs. per square inch and at a charging rate of 11:20 (eleven volumes of liquid charge per hour to twenty volumes of catalyst) for one and one-half hours, with a 98.5% liquid recovery, practically all of which was in the original boiling range. The acid heat of the charge was reduced from 143° F. to 15ᵈ F. Reactivation of the catalyst was effected in the manner described in Examples 1 and 2.

When the hydrogenating activity of a catalyst has been completely lost by continuing the operation until the reaction ceases, it is still possible to restore such lost activity by the present invention. This is accomplished by a series of short hydrogenating runs, each followed by a reactivation. The following procedures in reactivation have been found to be successful and may be considered as typical:

a. (1) Oxidize and reduce at 900° F. or above, atmospheric pressure (one sequence)
   (2) Oxidize and finally reduce at or below 700° F., atmospheric pressure (one sequence)
b. (1) Oxidize and reduce at 900° F. or above, atmospheric pressure (3 sequences)
   (2) Oxidize and finally reduce at or below 700° F., atmospheric pressure (one sequence)
c. (1) Oxidize and reduce at 900° F. or above, atmospheric pressure (one sequence)
   (2) Oxidize and reduce at or below 700° F., atmospheric pressure (3 sequences).

Any desired or convenient superatmospheric pressures may be utilized in any of the steps of reactivation, but are generally not necessary. Among other advantages, pressure is useful in reducing the total regenerating time, and especially in shortening the final reduction periods.

While certain catalysts and certain operations have been set forth herein to illustrate the invention and the manner of its use, it is to be understood that such illustrative examples are typical only and that the invention is not limited thereto, but covers all changes, modifications and adaptations within the scope of the appended claims.

I claim as my invention:

1. Process of regenerating catalysts capable of promoting hydrogenating reactions so as to restore their hydrogenating ability which comprises subjecting the catalyst to at least one sequence of oxidizing and reducing steps above 700° F. and thereafter subjecting the catalyst to at least one sequence of oxidizing and reducing steps below 700° F.

2. Process of regenerating catalysts capable of promoting hydrogenating reactions so as to restore their hydrogenating ability which comprises subjecting the catalyst to at least one sequence of oxidizing and reducing steps at elevated temperature and thereafter subjecting the catalyst to at least one sequence of oxidizing and reducing steps at lower temperature, the elevated temperature being below 1100° F. and the lower temperature being above 350° F.

3. Process of regenerating catalysts capable of promoting hydrogenating reactions so as to restore their hydrogenating ability which comprises subjecting the catalyst to recurring sequences of oxidizing and reducing steps, at least one of said sequences being effected above 700° F., and lowering the temperature of the catalyst by at least 150° F. and to at least as low as 700° F. before the last of said steps is effected.

4. Process of regenerating catalysts capable of promoting hydrogenating reactions so as to restore their hydrogenating ability which comprises subjecting the catalyst to recurring sequences of oxidizing and reducing steps, at least one of said sequences being effected above 700° C., and lowering the temperature of the catalyst by at least 150° F. and below 700° F. during the last of said sequences.

5. Process of regenerating catalysts capable of promoting hydrogenating reactions so as to restore their hydrogenating ability which comprises subjecting the catalyst to recurring sequences of oxidizing and reducing steps effected in the temperature range of 350° to 1100° F., the earlier sequences being effected in the upper portion of said range and at least the last sequence being effected in the lower portion of said range.

6. Process of reactivating spent catalysts which comprises subjecting the catalyst to recurring and alternating oxidizing and reducing steps within the temperature range of 850° to 1100° F. followed by at least one sequence of oxidizing and reducing steps at temperatures below said range, the final reducing step being effected in the temperature range of 350° to 700° F.

7. Process of reactivating spent catalysts which comprises alternately oxidizing and reducing the catalyst while maintaining the same above 850° F. in temperature, reducing the temperature of the catalyst to below 700° F. and then alternately oxidizing and reducing the catalyst while maintaining its temperature below 700° F.

8. Process of reactivating spent catalysts which comprises subjecting the catalyst in alternation to the action of an oxygen containing medium and to the action of a hydrogen containing medium in recurring sequences of oxidizing and reducing steps, effecting at least one of said sequences while the catalyst is maintained above 850° F., and effecting at least the last step of reduction while the temperature of the catalyst is maintained below 700° F.

9. Process of reactivating spent catalysts which comprises subjecting the catalyst in alternation to the action of oxygen or an oxygen containing medium and to the action of hydrogen or a hydrogen containing medium in recurring sequences of oxidizing and reducing steps, effecting at least one of said sequences in the temperature range of about 850° to 1000° F., oxidizing the catalyst while cooling it to a desired temperature below 700° F. and conducting the final reducing step while the catalyst is maintained below 700° F.

10. Process of reactivating spent catalysts which comprises subjecting the catalyst in alternation to the action of oxygen or an oxygen containing medium and to the action of hydrogen or a hydrogen containing medium in recurring sequences of oxidizing and reducing steps, effecting at least one of said sequences in the temperature range of about 850° to 1000° F., oxidizing the catalyst while cooling it to a desired temperature below 700° F. and conducting the final reducing step while holding the catalyst below 700° F. but permitting it to change in temperature over a range not exceeding about 200°.

11. Process of reactivating spent catalysts which comprises subjecting the catalyst in alternation to the action of oxygen or an oxygen containing medium and to the action of hydrogen or a hydrogen containing medium in recurring sequences of oxidizing and reducing steps, effecting at least one of said sequences in the temperature range of about 850° to 1000° F., oxidizing the catalyst while cooling it to a desired temperature below 700° F. and conducting the final reducing step in a manner to permit a temperature rise not exceeding 200° while limiting the maximum temperature of the catalyst to 700° F.

12. Process of regenerating catalysts capable of promoting hydrogenating reactions so as to restore their hydrogenating ability which comprises subjecting the catalyst to recurring sequences of oxidizing and reducing steps, effecting at least one of said sequences in the temperature range of 850° to 1100° F., thereafter reducing the temperature of the catalyst while at least one of the steps of a subsequent sequence is effected and until a temperature of about 350° F. is reached, and then conducting the final reducing step with a permissive rise in temperature of said catalyst of about 200°.

EUGENE J. HOUDRY.

CERTIFICATE OF CORRECTION.

Patent No. 2,273,864.  February 24, 1942.

EUGENE J. HOUDRY.

It is hereby certified that error appears in the printed specification of the above numbered patent requiring correction as follows: Page 4, first column, line 47, claim 4, for "700° C." read --700° F.--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.